US00RE38861E

(19) United States
(12) Reissued Patent
Park et al.

(10) Patent Number: US RE38,861 E
(45) Date of Reissued Patent: Nov. 1, 2005

(54) MULTIDEFLECTOR

(75) Inventors: Melvin Park, Billerica, MA (US); Claus Koster, Liliendhal (DE)

(73) Assignee: Bruker Daltonics, Inc., Billerica, MA (US)

(21) Appl. No.: 09/432,984

(22) Filed: Nov. 2, 1999

Related U.S. Patent Documents

Reissue of:
(64) Patent No.: 5,696,375
Issued: Dec. 9, 1997
Appl. No.: 08/560,396
Filed: Nov. 17, 1995

(51) Int. Cl.[7] ..... H01J 49/40; H01J 49/28

(52) U.S. Cl. ..... 250/287

(58) Field of Search ..... 250/287, 294, 250/396 R, 398

(56) References Cited

U.S. PATENT DOCUMENTS

| | | | | | |
|---|---|---|---|---|---|
| 4,197,482 | A | * | 4/1980 | Koorneef et al. | 313/403 |
| 4,524,278 | A | * | 6/1985 | Le Poole | 250/398 |
| 5,012,105 | A | * | 4/1991 | Ando et al. | 250/398 |
| 5,099,130 | A | * | 3/1992 | Aitken | 250/396 R |
| 5,117,107 | A | * | 5/1992 | Guilhaus et al. | 250/287 |
| 5,194,732 | A | * | 3/1993 | Bateman | 250/294 |

* cited by examiner

*Primary Examiner*—Jack Berman
(74) *Attorney, Agent, or Firm*—Ward & Olivio

(57) ABSTRACT

A method and apparatus to direct ions away from their otherwise intended or parallel course. Deflectors are used to establish electric fields in regions through which ions are to pass. With such electric fields, ions may be deflected to a desired trajectory. According to the present invention, a multideflector, in the form of a series of bipolar plates spaced evenly across the ion beam path, is used as an ion deflector.

40 Claims, 14 Drawing Sheets

MULTIDEFLECTOR

Matter enclosed in heavy brackets [ ] appears in the original patent but forms no part of this reissue specification; matter printed in italics indicates the additions made by reissue.

TECHNICAL FIELD

This invention relates generally to ion beam handling and more particularly to a deflector for use in time-of-flight mass spectrometry.

BACKGROUND ART

This invention relates in general to ion beam handling in mass spectrometers and more particularly to ion deflection in time-of-flight mass spectrometers (TOFMS). The apparatus and method of mass analysis described herein is an enhancement of the techniques that are referred to in the literature relating to mass spectrometry.

The analysis of ions by mass spectrometers is important, as mass spectrometers are instruments that are used to determine the chemical structures of molecules. In these instruments, molecules become positively or negatively charged in an ionization source and the masses of the resultant ions are determined in vacuum by a mass analyzer that measures their mass/charge (m/z) ratio. Mass analyzers come in a variety of types, including magnetic field (B), combined (double-focusing) electrical (E) and magnetic field (B), quadrupole (Q), ion cyclotron resonance (ICR), quadrupole ion storage trap, and time-of-flight (TOP) mass analyzers, which are of particular importance with respect to the invention disclosed herein. Each mass spectrometric method has a unique set of attributes. Thus, TOFMS is one mass spectrometric method that arose out of the evolution of the larger field of mass spectrometry.

The analysis of ions by TOFMS is, as the name suggests, based on the measurement of the flight times of ions from an initial position to a final position. Ions which have the same initial kinetic energy but different masses will separate when allowed to drift through a field free region.

Ions are conventionally extracted from an ion source in small packets. The ions acquire different velocities according to the mass-to-charge ratio of the ions. Lighter ions will arrive at a detector prior to high mass ions. Determining the time-of-flight of the ions across a propagation path permits the determination of the masses of different ions. The propagation path may be circular or helical, as in cyclotron resonance spectrometry, but typically linear propagation paths are used for TOFMS applications.

TOFMS is used to form a mass spectrum for ions contained in a sample of interest Conventionally, the sample is divided into packets of ions that are launched along the propagation path using a pulse-and-wait approach. In releasing packets, one concern is that the lighter and faster ions of a trailing packet will pass the heavier and slower ions of a preceding packet. Using the traditional pulse-and-wait approach, the release of an ion packet as timed to ensure that the ions of a preceding packet reach the detector before any overlap can occur. Thus, the periods between packets is relatively long. If ions are being generated continuously, only a small percentage of the ions undergo detection. A significant amount of sample material is thereby wasted. The loss in efficiency and sensitivity can be reduced by storing ions that are generated between the launching of individual packets, but the storage approach carries some disadvantages.

Resolution is an important consideration in the design and operation of a mass spectrometer for ion analysis. The traditional pulse-and-wait approach in releasing packets of ions enables resolution of ions of different masses by separating the ions into discernible groups. However, other factors are also involved in determining the resolution of a mass spectrometry system. "Space resolution" is the ability of the system to resolve ions of different masses despite an initial spatial position distribution within an ion source from which the packets are extracted. Differences in starting position will affect the time required for traversing a propagation path. "Energy resolution" is the ability of the system to resolve ions of different mass despite an initial velocity distribution. Different starting velocities will affect the time required for traversing the propagation path.

In addition, two or more mass analyzers may be combined in a single instrument to form a tandem mass spectrometer (MS/MS, MS/MS/MS, etc.). The most common MS/MS instruments are four sector instruments (EBEB or BEEB), triple quadrupoles (QQQ), and hybrid instruments (EBQQ or BEQQ). The mass/charge ratio measured for a molecular ion is used to determine the molecular weight of a compound. In addition, molecular ions may dissociate at specific chemical bonds to form fragment ions. Mass/charge ratios of these fragment ions are used to elucidate the chemical structure of the molecule. Tandem mass spectrometers have a particular advantage for structural analysis in that the first mass analyzer (MS1) can be used to measure and select molecular ion from a mixture of molecules, while the second mass analyzer (MS2) can be used to record the structural fragments. In tandem instruments, a means is provided to induce fragmentation in the region between the two mass analyzers. The most common method employs a collision chamber filled with an inert gas, and is known as collision induced dissociation CID. Such collisions can be carried out at high (5–10 keV) or low (10–100 eV) kinetic energies, or may involve specific chemical (ion-molecule) reactions. Fragmentation may also be induced using laser beams (photodissociation), electron beams (electron induced dissociation), or through collisions with surfaces (surface induced dissociation). It is possible to perform such an analysis using a variety of types of mass analyzers including TOF mass analysis.

In a TOFMS instrument, molecular and fragment ions formed in the source are accelerated to a kinetic energy:

$$eV = \frac{1}{2}mv^2 \tag{1}$$

where e is the elemental charge, V is the potential across the source/accelerating region, m is the ion mass, and v is the ion velocity. These ions pass through a field-free drift region of length L with velocities given by equation 1. The time required for a particular ion to traverse the drift region is directly proportional to the square root of the mass/charge ratio:

$$t = L\sqrt{\frac{m}{2eV}} \tag{2}$$

Conversely, the mass/charge ratios of ions can be determined from their flight times according to the equation:

$$\frac{m}{e} = at^2 + b \quad (3)$$

where a and b are constants which can be determined experimentally from the flight times of two or more ions of known mass/charge ratios.

Generally, TOF mass spectrometers have limited mass resolution. This arises because there may be uncertainties in the time that the ions were formed (time distribution), in their location in the accelerating field at the time they were formed (spatial distribution), and in their initial kinetic energy distributions prior to acceleration (energy distribution).

The first commercially successful TOFMS was based on an instrument described by Wiley and McLaren in 1955 (Wiley, W. C.; McLaren, I. H., Rev. Sci. Instrumen. 26 1150 (1955)). That instrument utilized electron impact (EI) ionization (which is limited to volatile samples) and a method for spatial and energy focusing known as time-lag focusing. In brief, molecules are first ionized by a pulsed (1–5 microsecond) electron beam. Spatial focusing was accomplished using multiple-stage acceleration of the ions. In the first stage, a low voltage (−150 V) drawout pulse is applied to the source region that compensates for ions formed at different locations, while the second (and other) stages complete the acceleration of the ions to their final kinetic energy (−3 keV ). A short time-delay (1–7 microseconds) between the ionization and draw out pulses compensates for different initial kinetic energies of the ions, and is designed to improve mass resolution. Because this method required a very fast (40 ns) rise time pulse in the source region, it was convenient to place the ion source at ground potential, while the drift region floats at −3 kV. The instrument was commercialized by Bendix Corporation as the model NA-2, and later by CVC Products (Rochester, N.Y.) as the model CVC-2000 mass spectrometer. The instrument has a practical mass range of 400 daltons and a mass resolution of 1/300 and is still commercially available.

There have been a number of variations on this instrument Muga (TOFTEC, Gainsville) has described a velocity compaction technique for improving the mass resolution (Muga velocity compaction). Chatfield et al. (Chatfield FT-TOF) described a method for frequency modulation of gates placed at either end of the flight tube, and Fourier transformation to the time domain to obtain mass spectra. This method was designed to improve the duty cycle.

Cotter et al. (VanBreeman, R. B.: Snow, M.: Cotter, R. J., Int. J. Mass Spectrom. Ion Phys. 49 (1983) 35.; Tabet, J. C.; Cotter, R. J., Anal. Chem. 56 (1984) 1662; Olthoff, J. K.; Lys. I.: Demirev, P.: Cotter, R. J.,Anal. Instrumen. 16 (1987) 93, modified a CVC 2000 time-of-flight mass spectrometer for infrared laser desorption of involatile biomolecules, using a Tachisto (Needham, Mass.) model 215G pulsed carbon dioxide laser. This group also constructed a pulsed liquid secondary time-of-flight mass spectrometer (liquid SIMS-TOF) utilizing a pulsed (1–5 microsecond) beam of 5 keV cesium ions, a liquid sample matrix, a symmetric push/pull arrangement for pulsed ion extraction (Olthoff, J. K.; Cotter, R. J., Anal. Chem. 59 (1987) 999–1002.; Olthoff, J. K.; Cotter, R. J., Nucl. Instrum. Meth. Phys. Res. B-26 (1987) 566–570. In both of these instruments, the time delay range between ion formation and extraction was extended to 5–50 microseconds, and was used to permit metastable fragmentation of large molecules prior to extraction from the source. This in turn reveals more structural information in the mass spectra.

The plasma desorption technique introduced by Macfarlane and Torgerson in 1974 (Macfarlane, R. D.; Skowronski, R. P.; Torgerson, D. F., Biochem. Biophys. Res Commoun. 60 (1974) 616.) formed ions on a planar surface placed at a voltage of 20 kV. Since there are no spatial uncertainties, ions are accelerated promptly to their final kinetic energies toward a parallel, grounded extraction grid, and then travel through a grounded drift region. High voltages are used, since mass resolution is proportional to U o/;eV, where the initial kinetic energy, U O/is of the order of a few electron volts. Plasma desorption mass spectrometers have been constructed at Rockefeller (Chait, B. T.; Field, F. H., J. Amer. Chem. Soc. 106 (1984) 193), Orsay LeBeyec, Y.; Della Negra, S.; Deprun, C.; Vigny, P.; Giont, Y. M., Rev. Phys. Appl. 15 (1980) 1631), Paris (Viari, A.; Ballini, J. P.; Vigny, P.; Shire, D.; Dousset, P., Biomed. Environ. Mass Spectrom, 14 (1987) 83), Upsalla (Hakansson, P.; Sundqvist B., Radial Eff. 61 (1982) 179) and Darmstadt (Becker, O.; Furstenau, N.; Krueger, F. R.; Weiss, G.; Wein, K., Nucl. Instrum. Methods 139 (1976) 195). A plasma desorption time-of-flight mass spectrometer has bee commercialized by BIO-ION Nordic (Upsalla, Sweden). Plasma desorption utilizes primary ion particles with kinetic energies in the MeV range to induce desorption/ionization. A similar instrument was constructed at Manitobe (Chain, B. T.; Standing, K. G., Int. J. Mass Spectrum. Ion Phys. 40 (1981) 185) using primary ions in the keV range, but has not been commercialized.

Matrix-assited laser desorption, introduced by Tanaka et al. (Tanaka, K.; Waki, H.; Ido, Y.; Akita, S.; Yoshida, Y.; Yoshica, T., Rapid Commun. Mass Spectrom. 2 (1988) 151) and by Karas and Hillenkarnp (Karas, M.; Hillenkarnp, F., Anal. Chem. 60 (1988) 2299) utilizes TOFMS to measure the molecular weights of proteins in excess of 100,000 daltons. An instrument constructed at Rockefeller (Beavis, R. C.; Chait, B. T., Rapid Commun. Mass Spectrom. 3 (1989) 233) has been commercialized by VESTEC (Houston, Tex.), and employs prompt two-stage extraction of ions to an energy of 30 keV.

Time-of-flight instruments with a constant extraction field have also been utilized with multi-photon ionization, using short pulse lasers.

The instruments described thus far are linear time-of-flights, that is: there is no additional focusing after the ions are accelerated and allowed to enter the drift region. Two approaches to additional energy focusing have been utilized: those which pass the ion beam through an electrostatic energy filter.

The reflectron (or ion mirror) was first described by Mamyrin (Mamyrin, B. A.; Karatajev. V. J.; Shmikk, D. V.; Zagulin, V. A, Sov. Phys., JETP 37 (1973) 45). At the end of the drift region, ions enter a retarding field from which they are reflected back through the drift region at a slight angle. Improved mass resolution results from the fact that ions with larger kinetic energies must penetrate the reflecting field more deeply before being turned around. These faster ions than catch up with the slower ions at the detector and are focused. Reflectrons were used on the laser microprobe instrument introduced by Hillenkamp et al. (Hillenkamp, F.; Kaufmann, R.; Nitsche, R.; Unsold, E., Appl. Phys. 8 (1975) 341) and commercialized by Leybold Hereaus as the LAMMA (LAser Microprobe Mass Analyzer). A similar instrument was also commercialized by Cambridge Instruments as the IA ( Laser Ionization Mass Analyzer). Benninghoven (Benninghoven reflectron) has described a SIMS (secondary ion mass spectrometer) instrument that also utilizes a reflectron, and is currently being commercialized by Leybold Hereaus. A reflecting SIMS instrument has also been constructed by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Lebeyec (Della-Negra, S.; Lebeyec, Y., in Ion Formation from Organic Solids IFOS III, ed. by A Benninghoven, pp 42–45, Springer-Verlag, Berlin (1986)) described a coaxial reflectron time-of-flight that reflects ions along the same path in the drift tube as the incoming ions, and records their arrival times on a channelplate detector with a centered hole that allows passage of the initial (unreflected) beam. This geometry was also utilized by Tanaka et al. (Tanaka, K.; Waki, H.; Ido, Y.; Akita, S.; Yoshida, T., Rapid Comun. Mass Spectrom. 2 (1988) 151) for matrix assisted laser desorption. Schlag et al. (Grotemeyer, J.; Schlag, E. W., Org. Mass Spectrom. 22 (1987) 758) have used a reflectron on a two-laser instrument. The first laser is used to ablate solid samples, while the second laser forms ions by multiphoton ionization. This instrument is currently available from Broker. Wollnik et al. (Grix., R.; Kutscher, R.; Li, G.; Gruner, U.; Wollnik, H., Rapid Commun. Mass Spectrom. 2 (1988) 83) have described the use of reflectrons incombination with pulsed ion extraction, and achieved mass resolutions as high as 20,000 for small ions produced by electron impact ionization.

An alternative to reflectrons is the passage of ions through an electrostatic energy filter, similar to that used in double-focusing sector instruments. This approach was first described by Poschenroeder (Poschenroeder, W., Int. J. Mass Spectrom. Ion Phys. 6 (1971) 413). Sakurai et al. (Sakuri, T.; Fujita, Y; Matsuo, T.; Matsuda, H; Katakuse, I., Int. J. Mass Spectrom. Ion Processes 66 (1985) 283) have developed a time-of-flight instrument employing four electrostatic energy analyzers (ESA) in the time-of-flight path. At Michigan State, an instrument known as the ETOF was described that utilizes a standard ESA in the TOF analyzer (Michigan ETOF).

Lebeyec et al. (Della-Negra, S.; Lebeyec, Y., in Ion Formation from Organic Solids IFOS III, ed. by A. Benninghoven, pp 42–45, Springer-Verlag, Berlin (1986)) have described a technique known as correlated reflex spectra, which can provide information on the fragment ion arising from a selected molecular ion. In this technique, the neutral species arising from fragmentation in the flight tube are recorded by a detector behind the reflectron at the same flight time as their parent masses. Reflected ions are registered only when a neutral species is recorded within a preselected time window. Thus, the resultant spectra provide fragment ion (structural) information for a particular molecular ion. This technique has also been utilized by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Although TOF mass spectrometers do not scan the mass range, but record ions of all masses following each ionization event, this mode of operation has some analogy with the linked scans obtained on double-focusing sector instruments. In both instruments, MS/MS information is obtained at the expense of high resolution. In addition correlated reflex spectra can be obtained only on instruments which record single ions on each TOF cycle, and are therefore not compatible with methods (such as laser desorption) which produce high ion currents following each laser pulse.

New ionization techniques, such as plasma desorption (Macfarlane, R. D.; Skowronski, R. P.; Torgerson, D. F.; Biochern. Bios. Res. Commun. 60 (1974) 616), laser desorption (VanBreemen, R. B.; Snow, M.; Cotter, R. J., Int. J. Mass Spectrom. Ion Phys. 49 (1983) 35; Van der Peyl, G. J. Q.; Isa, K.; Haverkamp, J.; Kistemaker, P. G., Org. Mass Spectrom. 16 (1981) 416), fast atom bombardment (Barber, M.; Bordoli, R. S.; Sedwick, R. D.; Tyler, A. N., J. Chem. Soc., Chem. Commun. (1981) 325–326) and electrospray (Meng, C. K.; Mann, M.; Fenn, J. B., Z. Phys. D10 (1988) 361), have made it possible to examine the chemical structures of proteins and peptides, glycopeptides, glycolipids and other biological compounds without chemical derivatization. The molecular weights of intact proteins can be determined using matrix assisted laser desorption ionization (MALDI) on a TOF mass spectrometer or electrospray ionization. For more detailed structural analysis, proteins are generally cleaved chemically using CNBr or enzymatically using trypsinor other proteases. The resultant fragments, depending upon size, can be mapped using MALDI, plasma desorption or fast atom bombardment. In this case, the mixture of peptide fragments (digest) is examined directly resulting in a mass spectrum with a collection of molecular ion corresponding to the masses of each of the peptides. Finally, the amino acid sequences of the individual peptides which make up the whole protein can be determined by fractionation of the digest, followed by mass spectral analysis of each peptide to observe fragment ions that correspond to its sequence.

It is the sequencing of peptides for which tandem mass spectrometry has its major advantages. Generally, most of the new ionization techniques are successful in producing intact molecular ions, but not in producing fragmentation. In the tandem instrument the first mass analyzer passes molecular ions corresponding to the peptide of interest. These ions are fragmented in a collision chamber, and their products extracted and focused into the second mass analyzer which records a fragment ion (or sequence) spectrum.

A tandem TOFMS consists of two TOF analysis regions with an ion gate between the two regions. As in conventional TOFMS, ions of increasing mass have decreasing velocities and increasing flight times. Thus, the arrival time of ions at the ion gate at the end of the first TOF analysis region is dependent on the mass-to-charge ratio of the ions. If one opens the ion gate only at the arrival time of the ion mass of interest, then only ions of that mass-to-charge will be passed into the second TOF analysis region.

However, it should be noted that the products of an ion dissociation that occurs after the acceleration of the ion to its final potential will have the same velocity as the original ion. The product ions will therefore arrive at the ion gate at the same time as the original ion and will be passed by the gate (or not) just as the original ion would have been.

The arrival times of product ions at the end of the second TOF analysis region is dependent on the product ion mass because a reflectron is used. As stated above, product ions have the same velocity as the reactant ions from which they originate. As a result, the kinetic energy of a product ion is directly proportional to the product ion mass. Because the flight time of an ion through a reflectron is dependent on the kinetic energy of the ion, and the kinetic energy of the product ions are dependent on their masses, the flight time of the product ions through the reflectron is dependent on their masses.

As TOFMS is a pulsed technique, one of the difficulties in its use is in interfacing it with continuous ion sources such as electrospray ionization. One common method for interfacing such a source with TOFMS is referred to as orthogonal acceleration. In this method, the TOF analysis is performed in a direction which is roughly orthogonal to the direction of motion of the ion beam produced by the source. The beam from the source passes into and through an interface region at the beginning of the TOF mass spectrometer. In the interface region, the ion beam passes between accelerating electrodes. By energizing the accelerating electrodes, the portion of the ion beam which is between the accelerating electrodes is accelerated such that a TOF mass analysis can be performed on these ions. Ideally, the accelerating electrodes are energized at regular intervals such that all the ions from the source are accelerated and analyzed.

The difficulty with the orthogonal acceleration method is that if the TOF direction is to be truly orthogonal to the direction of motion of the ion beam, the ions must be deflected using a deflector or similar device. This causes a distortion in the flight times of the ions and thus decreases the mass resolution of the spectrometer.

The purpose of the present invention is to achieve truly orthogonal TOFMS while maintaining a higher mass resolution than can otherwise be achieved in similar instruments.

Several references relate to the technology herein disclosed. For example, F. Hillenkamp, M. Karas, R. C. Beavis, B. T. Chait, Anal. Chem. 63(24), 1193A(1991); Wei Hang, Pengyuan Yag, Xiaoru Wang, Chenglong Yang, Yongxuan Su, and Benli Huang, Rapid Comm. Mass Spectrom. 8, 590(1994); A. N. Verentchikov, W. Ens, K. G. Standing, Anal. Chem. 66, 126(1994); J. H. J. Dawson, M. Guilhaus, Rapid Comm. Mass Spectrom. 3, 155(1989); M. Guilhaus, J. Am. Soc. Mass Spectrom. 5, 588(1994); E. Axelsson, L. Holmlid, Int. J. Mass Spectrom. Ion Process. 59.231(1984); O. A. Mirgorodskaya, et al., Anal. Chem. 66, 99(1994); S. M. Michael, B. M. Chien, D. M. Lubman, Anal. Chem. 65, 2614(1993).

SUMMARY OF THE INVENTION

One of the major considerations in the design of TOF mass spectrometers is that of ion deflection. Ion deflection serves the purpose of both steering the ion beam onto a desired path and for selecting/rejecting ions during the course of the mass spectroscopic analysis. In conventional spectrometers, ion deflection is typically achieved via deflection plates. A conventional deflector consist of two metal plates which are placed parallel to one another on opposite sides of the expected path of the ion beam in planes which are perpendicular to the direction in which the ion beam is to be deflected. These deflection plates are biased to an electrical potential which produces the desired deflection. The difficulty with such a deflection system in a TOF mass spectrometer is that its use results in distortions in the flight times of the deflected ions.

The distortions in ion flight times caused by the use of deflection plates is the result of 1) differences in the flight times of ions through the deflection region and 2) changes in the velocities of the ions in the time-of-flight direction resulting from deflection. The present invention reduces the differences in the flight times of ions through the deflection region to negligible values by reducing the length of the deflection region and by decreasing the potentials on the deflecting elements.

In the multideflector, an array of special bipolar deflection plates is used to induce ion deflection. Each multideflector deflection plate is composed of two metal plates separated by an insulator. When active the two metal plates are biased to the same electrical potential but with opposite polarities. The bipolar deflection plates are placed adjacent, and parallel to one another, and approximately parallel to the ion beam path such that when the multideflector is deenergized, the vast majority of the ion beam passes unperturbed through the device. Further, the bipolar plates are assembled into the multideflector such that each side of each deflection plate is facing the opposite polarity side of the adjacent deflection plate.

The invention is a specific design for an Orthogonal TOF mass spectrometer incorporating Einsellens focusing, and a single stage grided reflector. Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

DETAILED DESCRIPTION OF THE PREFERRED EMBODIMENT

Figure 1A:
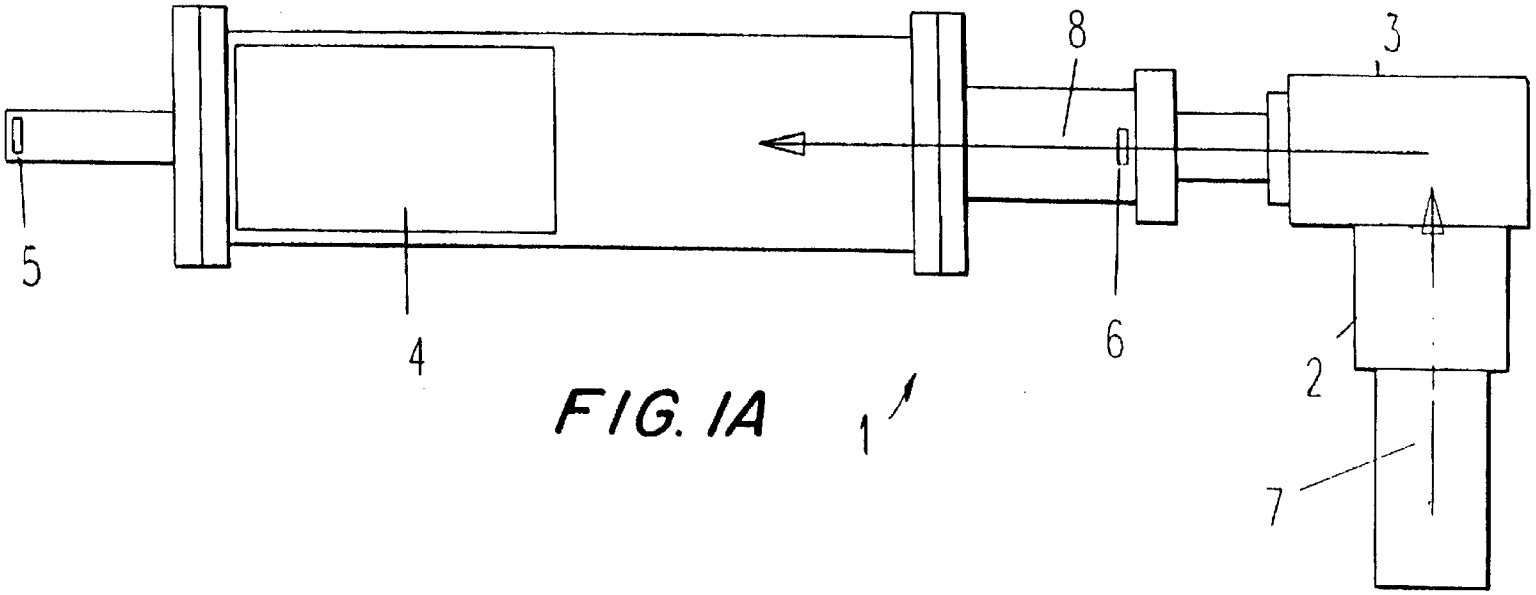
FIG. 1A is a schematic view of a prior art Orthogonal TOF mass spectrometer as seen from above.

With respect to FIG. 1A, a prior art TOFMS 1 is shown, with an ion source 2, interface 3, reflectron 4, linear detector 5, and reflector detector 6. In FIG. 1, ions are generated in the source 2 by, for example, electrospray ionization. Ions are accelerated through, and out of, the ion source 2 along path 7. In the interface 3, the ions are accelerated in a direction which is orthogonal to their original direction of motion. After this acceleration, ions are deflected onto a trajectory 8 which is truly orthogonal to their original direction of motion given by path 7.

Figure 1B:
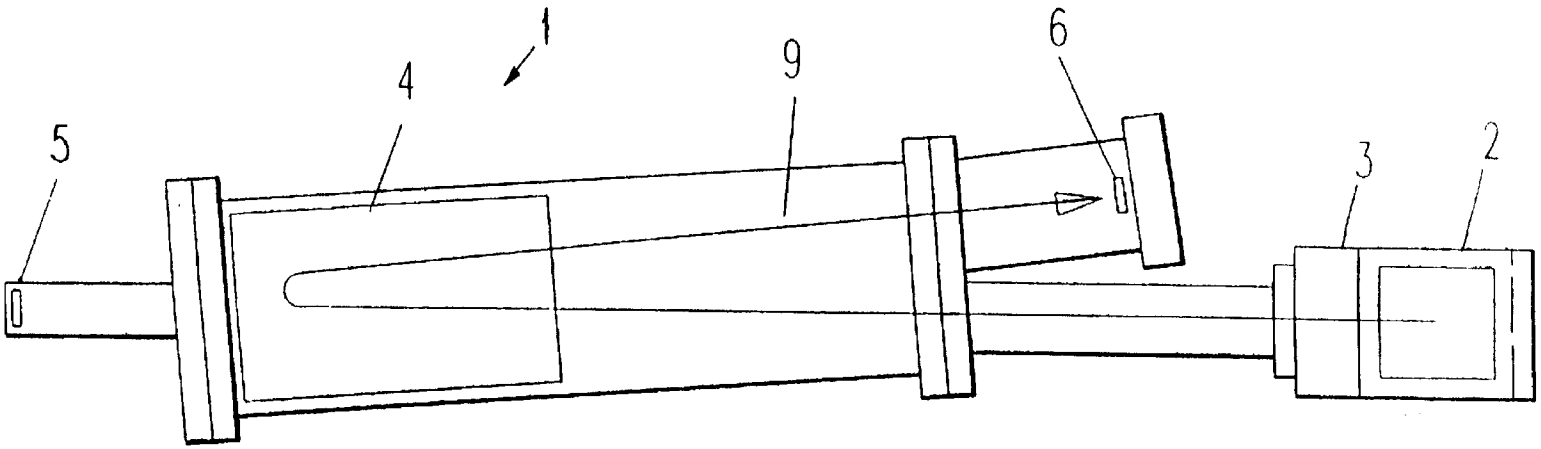
FIG. 1B is a schematic view of a prior art Orthogonal TOF mass spectrometer as seen from the side.

The TOF mass analysis takes place in a plane which is orthogonal to path 7. An example ion path 9 through the spectrometer in this plane is depicted in FIG. 1B. The TOF mass analysis begins in interface 3 where ions are accelerated by an electric field and deflected onto a proper trajectory. Ions pass out of the interface and drift through the spectrometer until arriving at reflectron 4. If the reflectron is deenergized, the ions will drift through the reflectron and strike detector 5. If the reflectron is energized, however, the ions will be reflected and eventually strike detector 6 according to path 9. By measuring the time required for the ions to move from their starting point in the interface to one of the detectors, the mass to charge ratio of the ions can be determined. The mass and relative abundance of the ions is determined by measuring the time required for the ions to travel from their starting point in the interface to one of the detectors and the signal intensity at the detectors respectively.

Figure 2:
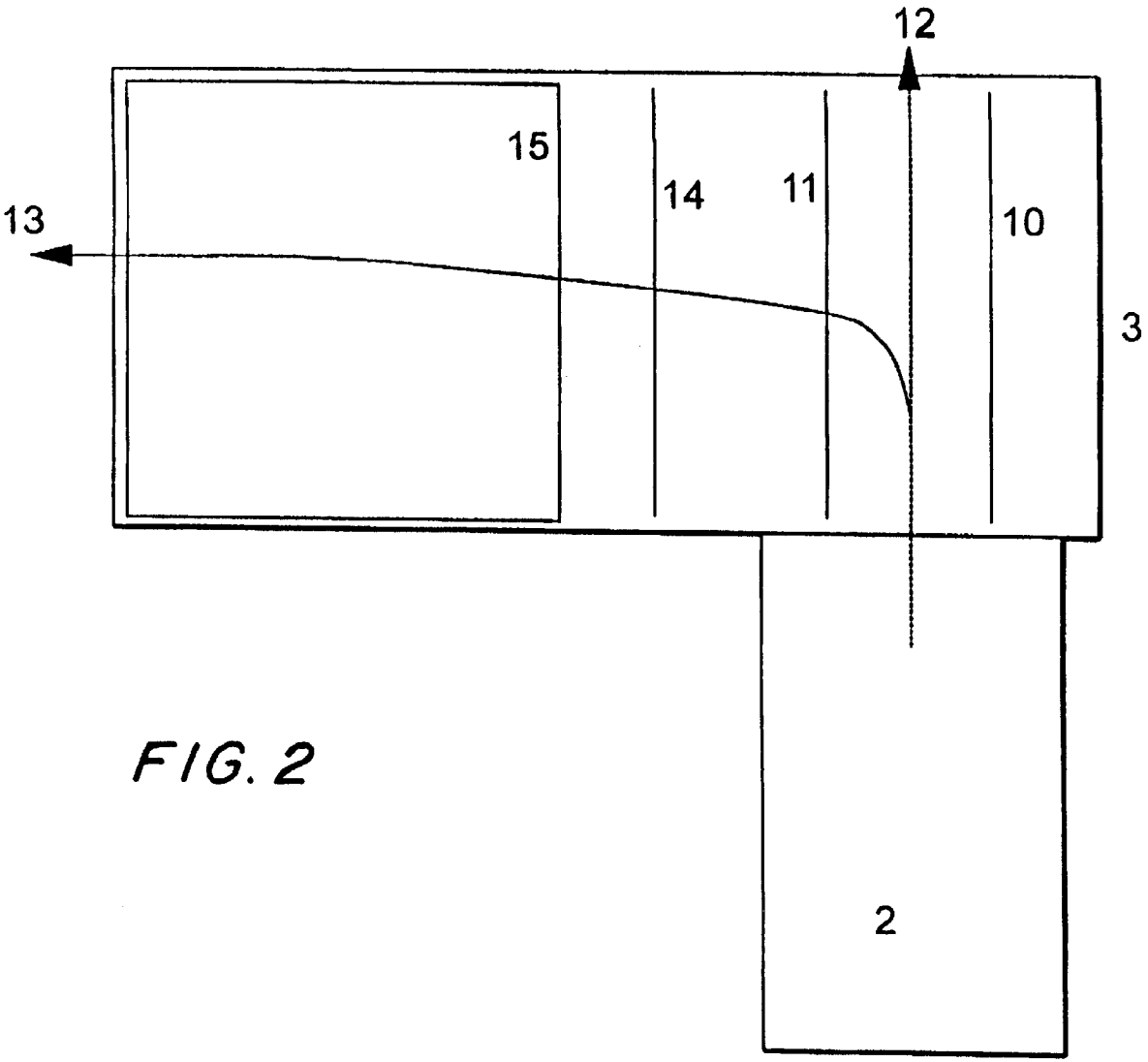
FIG. 2 is a depiction of an ion source and interface region, as used with the present invention.

With respect to FIG. 2, a block diagram of an ion source 2 and interface 3 is shown. Ions generated in ion source 2 travel through interface 3 according to ion paths 12 and 13. The interface consists of a repeller plate 10, extraction grid 11, grounded grid 14, and deflection system 15. Repeller plate 10 is a metal plate which lies in a plane parallel to ion path 12 and perpendicular to the final direction of ion motion given by path 13. Extraction grid 11 and grounded grid 14 are composed of fine mesh metal grid (e.g. 90% transmission, 70 lines per inch) mounted on metal rings. Elements 11 and 14 lie in planes parallel to repeller plate 10. Deflection system 15 may take on a variety of forms as will be detailed below.

When elements 10 and 11 are deenergized—that is when elements 10 and 11 are held at ground electrical potential—ions from source 2 may pass freely through the interface according to path 12. When energized, a potential difference is imposed between elements 10 and 11 and between elements 11 and 14. Those ions which are between elements 10 and 11 when the potentials are applied are accelerated by the resulting electric fields along paths which are parallel to example ion path 13. Even though the electric fields between elements 10 and 14 accelerate the ions in a direction which is orthogonal to path 12, the ions retain their initial velocity in the axial direction (i.e. in the direction given by path 12). As a result, the ions enter deflection system 15 moving in a direction which is not exactly orthogonal to path 12. Typically, ions enter deflection system 15 moving in a direction which is 3 to 6 degrees from the orthogonal direction. Because the TOF mass analysis occurs in the orthogonal direction, the deflection system must turn the ions onto a path which is orthogonal to path 12.

Figure 3:
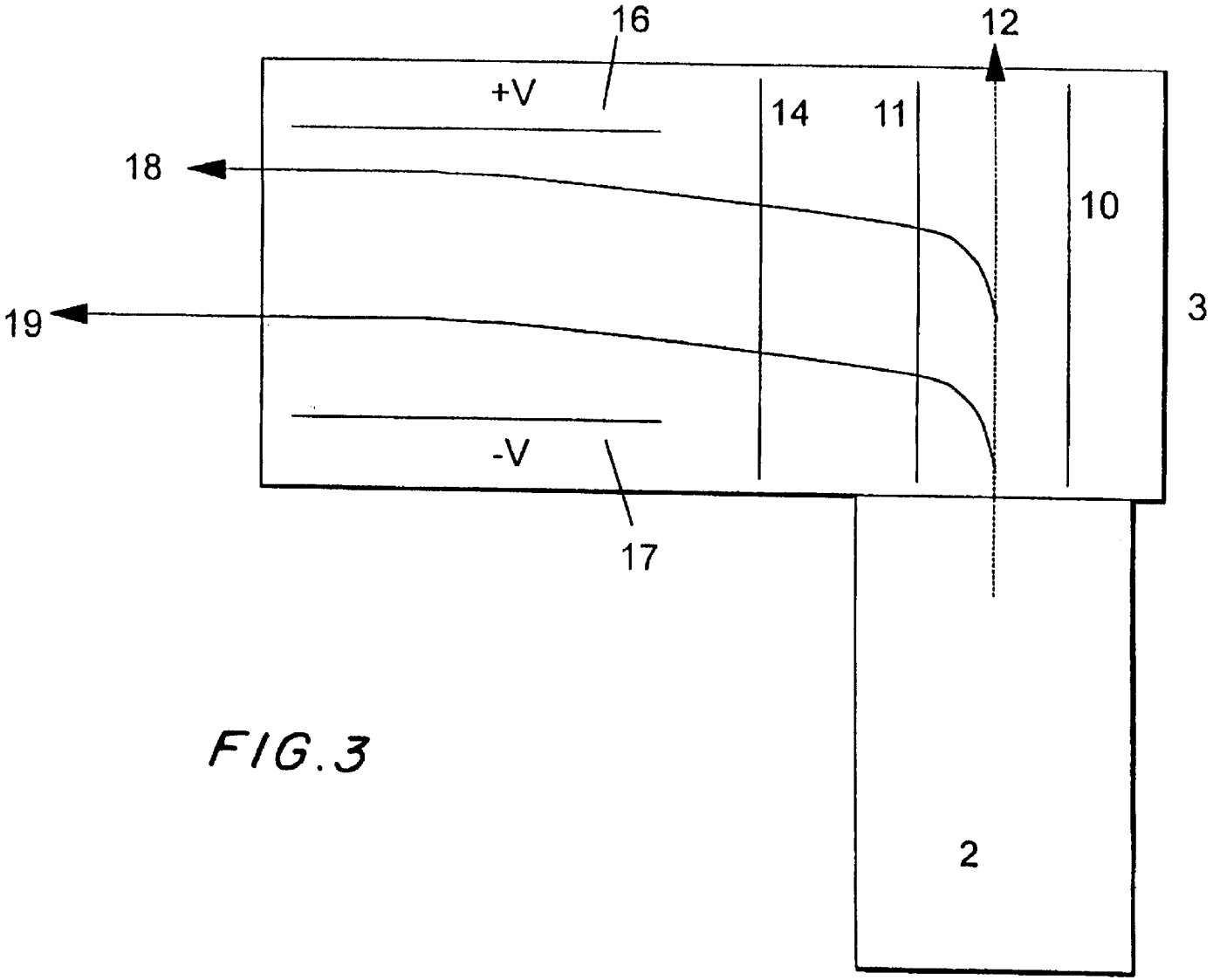
FIG. 3 is a depiction of an ion source and interface region including a conventional deflection plate system.

With respect to FIG. 3, a block diagram of an ion source 2 and interface 3 is shown with deflection plates 16 and 17 used as the deflection system. Deflection plates 16 and 17 are metal plates which are placed parallel to one another on opposite sides of the expected path of the ion beam in planes which are perpendicular to the direction in which the ion beam is to be deflected. Assuming the ions are positively charged, the plate which the ions are to be deflected away from will be maintained at a positive potential. The opposing deflection plate will be maintained at an equally negative potential. Thus, an electric field is produced between deflection plates 16 and 17 which then deflects the ions in the axial direction. However, as the ions enter and exit this electric field, they are also accelerated in the orthogonal direction. As a result, the flight time of ions through the electric field will vary depending on the position at which the ions enter and exit the field. In FIG. 3, two possible ion paths 18 and 19 are depicted in order to demonstrate that the ion beam has a significant width in the dimension in which it is to be deflected. Positively charged ions entering the electric field close to positively biased deflection plate 16 have a longer flight time through the field than ions entering the field close to negatively biased deflection plate 17. This dependence is approximated by:

$$t = \frac{L}{\sqrt{\frac{2}{m}\left(\epsilon - \frac{qV}{2}\left(1 - \frac{2x}{d}\right)\right)}} \tag{4}$$

where t is the ion flight time through the field, L is the length of deflection plate in the orthogonal direction, m is the mass of the ion, is the kinetic energy of the ion, q is the charge on the ion, V is the potential difference between the plates, x is the distance between the ion and the positively biased plate when the ion enters the field, and d is the distance between the plates. Because the mass of an ion is determined by its total flight time from the interface to the detector, variations in the flight times of ions as given in equation 4 result in loss of mass resolving power in the spectrometer as a whole. As given in equation 4, the variation in ion flight times can be reduced by decreasing V and L. This has been accomplished in the design of the multideflector while maintaining the capabilities of the conventional deflection plate design.

Figure 4A:
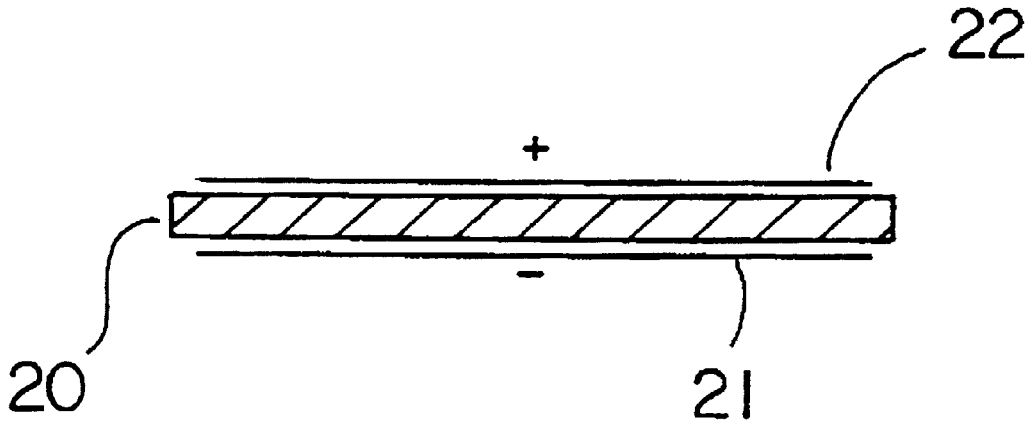
FIG. 4A is a side view of a bipolar deflection plate as used in the multideflector.
Figure 4B:
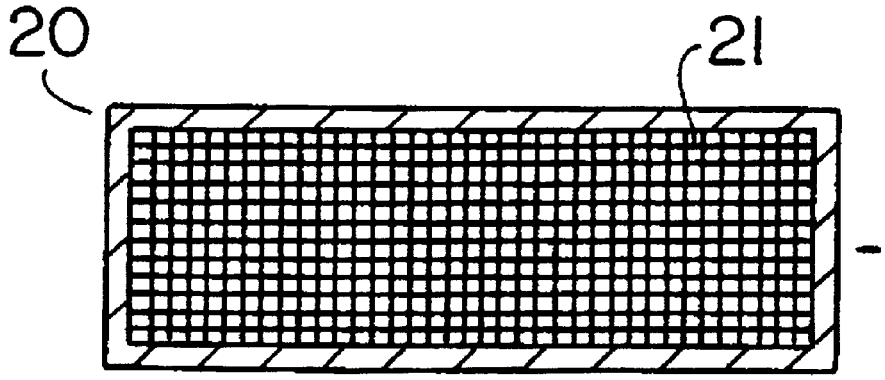
FIG. 4B is a bottom view of a bipolar deflection plate as used in the multideflector.

FIG. 4A is a side view depiction of a bipolar deflection plate which is essential to the construction of a multideflector according to the present invention. FIG. 4B is a bottom view depiction of a bipolar deflection plate which is essential to the construction of a multideflector according to the present invention. The bipolar deflection plate consists of two metal foils 21 and 22 separated from one another by insulator 20. The total thickness of the deflection plate can be as little as 0.1 mm thick. As used in the Broker orthogonal TOF mass spectrometer, the bipolar deflection plate is 0.11 mm thick and consists of a 25 um thick polyamide insulator, 18 um thick metal foils, and adhesive having a total of 50 um thickness which holds the two metal foils to the insulator.

Figure 5A:
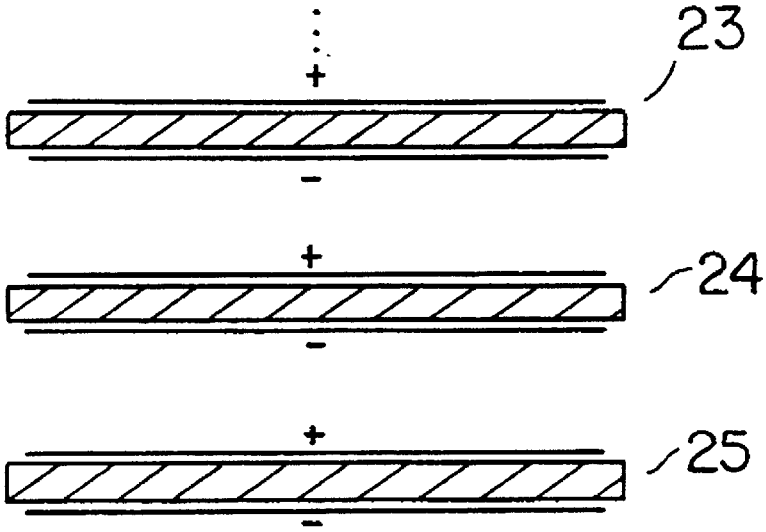
FIG. 5A is a side view depiction of how bipolar deflection plates are assembled to form a multideflector.
Figure 5B:
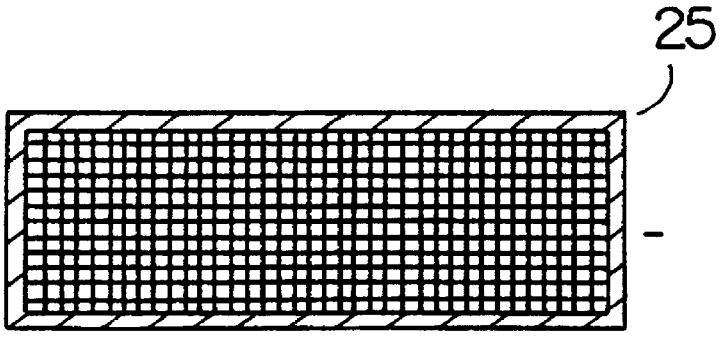
FIG. 5B is a bottom view depiction of how bipolar deflection plates are assembled to form a multideflector.

FIG. 5A is a side view depiction of the geometrical arrangement of bipolar deflection plates 23, 24, and 25 in a multideflector according to the present invention. FIG. 5B is a bottom view depiction of the geometrical arrangement of bipolar deflection plates in a multideflector according to the present invention. As shown, in FIG. 5, the bipolar deflection plates are placed adjacent and parallel to one another such that each side of every plate is facing the side of the adjacent plate which is of the opposite polarity. Also note that, for the sake of convenience, the distance between adjacent plates is a constant.

Figure 6A:
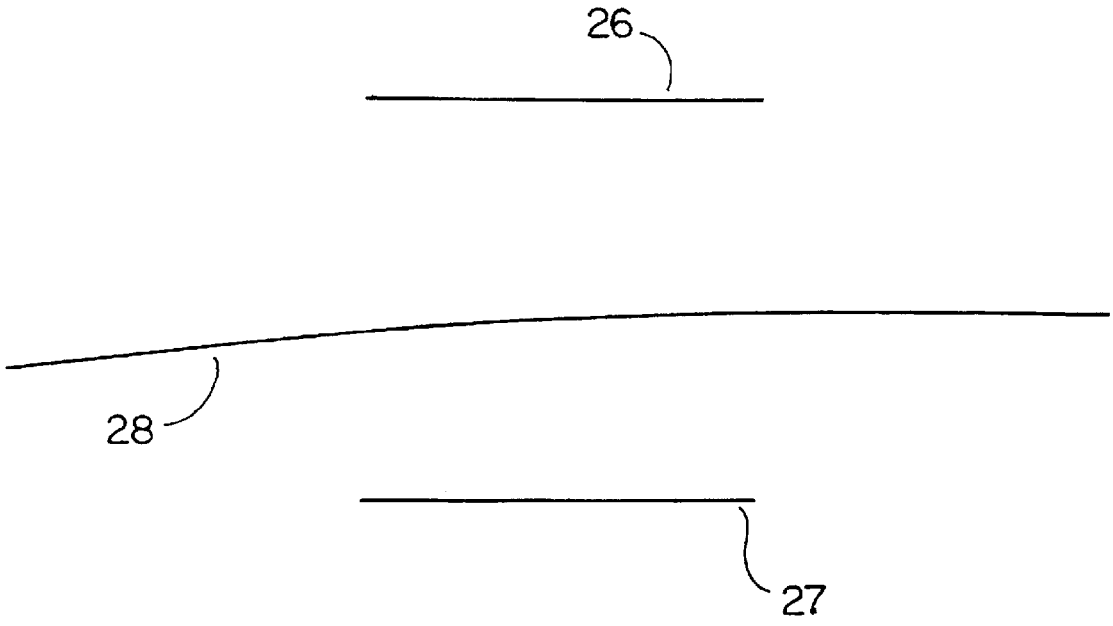
FIG. 6A is a diagram depicting the use of conventional deflection plates and an example ion path.
Figure 6B:
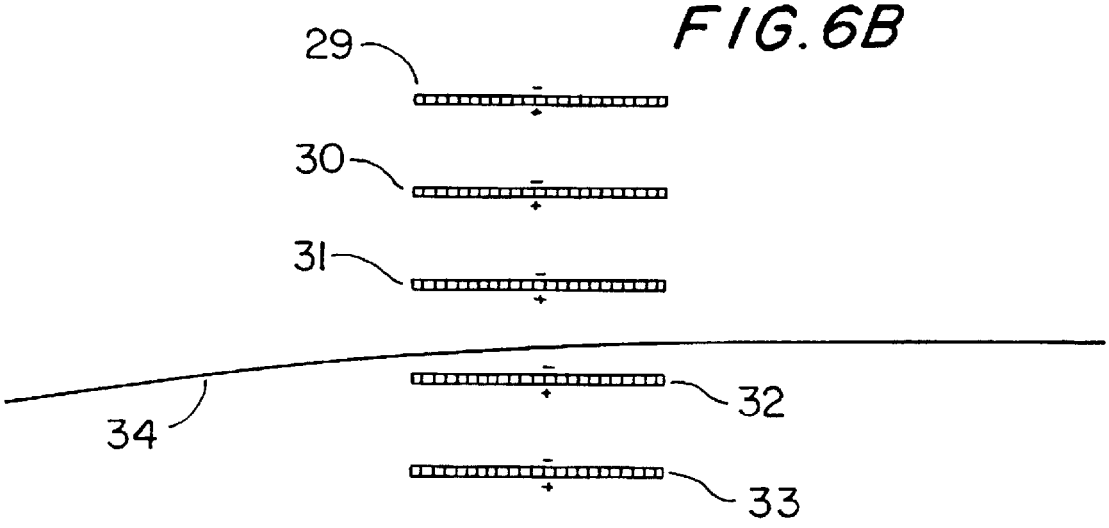
FIG. 6B is a diagram depicting the use of a multideflector and an example ion path.

Some of the advantages of the multideflector of the present invention over conventional deflection plates are demonstrated in FIGS. 6A and 6B. FIGS. 6A and 6B show a cross-sectional view of a set of conventional deflection plates and a multideflector respectively and a representative ion trajectory through the energized devices as determined by a numerical calculation. The calculations were performed assuming an ion entering from the left has a kinetic energy of 3 keV and is moving in a direction of 6 degrees from the orthogonal direction. The potentials on the devices were then adjusted so that the ion was deflected onto an orthogonal path (i.e. a path from left to right). It is easy to show that ions passing between two adjacent deflection plates of either device are deflected by an angle:

$$\mathrm{Tan}(\theta) = \frac{qV}{\epsilon}\left(\frac{L}{d}\right) \tag{5}$$

where θ is the angle of deflection, V is the voltage on the plates, and L is the length of the plates in the orthogonal direction, q is the elemental charge, d is the distance between the plates, and e is the kinetic energy of the ion. Thus, under a given set of conditions, one can obtain the same degree of deflection at, for example, half the voltage by doubling L or decreasing d by a factor of 2.

Note that the scale of FIGS. 6A and 6B are not identical. In FIG. 6A, the length of the deflection plates is 40 mm whereas in FIG. 6B the length of the plates is 10 mm. Further, the distance between the plates of the conventional deflector was taken to be 40 mm so that it can accommodate the broad ion beams expected. In contrast, the distance between the plates of the multideflector as shown in FIG. 6B was chosen to be 3 mm. In order to accommodate broad ion beams, the plates of the multideflector are spaced across the expected ion beam path such that every ion of the beam must pass between a pair of deflection plates.

One of the primary considerations in choosing the distance between the plates is that of transmission efficiency. In a first approximation, if the plates are 0.1 mm thick and the distance between the plates is 3 mm then about 3% of the ion beam will collide with the plates while 97% of the beam will pass through the device and be analyzed.

A second consideration in selecting the distance between the plates in the multideflector is that of operating voltage. In accordance with equations 4 and 5, lower voltages are desirable in order to maintain a high mass resolution. Consequently, a small intexplate distance is desirable. The selection of the interplate distance is thus a trade-off of transmission efficiency and mass resolution.

The results of the simulation as shown in FIG. 6A indicate that + and −200 V are required on plates 26 and 27 respectively in order to produce ion trajectory 28. Further, + and −100 V are required on plates 29 through 33 in order to produce ion trajectory 34. In accordance with equation 4, the distribution in flight times of 1000 amu ions passing through the conventional deflector of FIG. 6A should span 111 ns. In contrast, because d and L are smaller for the multideflector, the distribution in flight times of these ions passing through the multideflector of FIG. 6B should span only 14 ns. This order of magnitude difference in the flight time distribution implies that the best mass resolution of the instruments in which they are used can also differ by an order of magnitude.

Figure 7A:
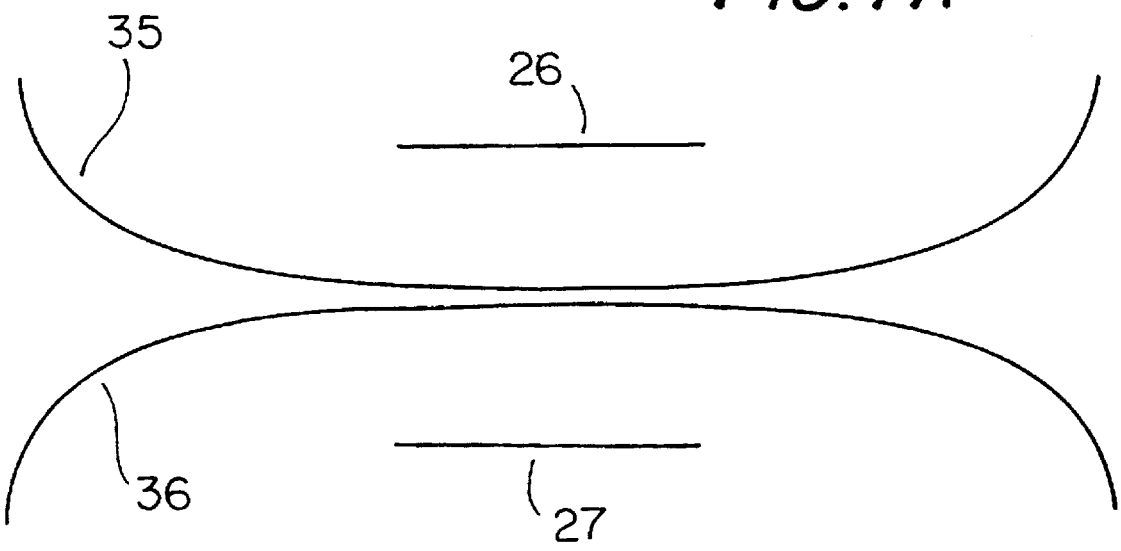
FIG. 7A is a diagram depicting the electric fields associated with conventional deflection plates under the conditions of FIG. 6A.
Figure 7B:
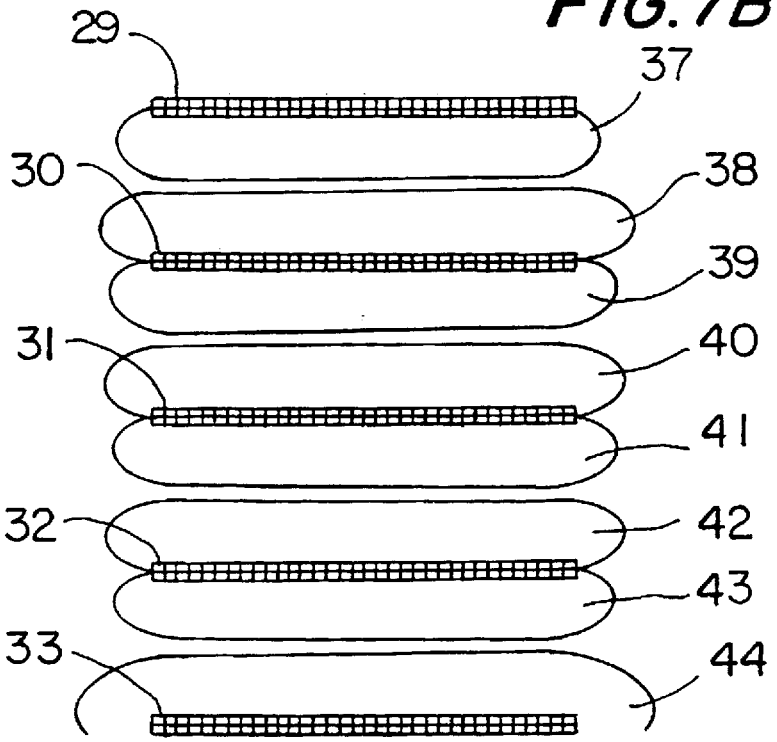
FIG. 7B is a diagram depicting the electric fields associated with a multideflector according to the present invention under the conditions of FIG, 6B.

Another advantage of the multideflector over conventional deflection plates is depicted in FIGS. 7A and 7B. In FIGS. 7A and 7B the conventional deflection plates and the multideflector of FIGS. 6A and 6B respectively are shown together with the 10 V equipotential lines associated with the devices under the conditions of FIG. 6. As seen in FIG. 7A, the +10 V and −10 V equipotential lines 35 and 36 respectively extend more than 40 mm to either side of the deflection plates. In contrast, as depicted in FIG. 7B, the +10 V equipotential lines 37, 39, 41, and 43, and the −10 V equipotential lines 38, 40, 42, and 44 extend only about 1 mm to either side of the multideflector. Clearly, the dipole character of the bipolar deflection plates of the multideflector confine the electric field of the multideflector to the immediate vicinity of the multideflector. In this regard, the multideflector is self shielding.

This characteristic also makes the multideflector more predictable than the conventional deflector particularly in regard to the relationship between applied voltage and deflection angle. In accordance with equation ±315 V should be applied to the conventional deflector of FIG. 6A in order to obtain the observed deflection. However, the actual voltage required is ±200 V. This difference in the numerical and analytical results is the result of the extended field lines depicted in FIG. 7A. Because the electric field extends so far from the deflector, the effective length, L, of the deflector is longer than the deflection plates. As predicted by equation 5, a larger length leads to a smaller required deflection voltage.

In contrast, because the multideflector is self shielding, the effective length is nearly the same as the length, L, of the plates. Thus, the required deflection voltage of ±95 V predict using equation 5 is in close agreement with the ±100 V determined using the numerical calculation. In this manner, the predictability of the multideflector makes it a more practical device.

Figure 8:
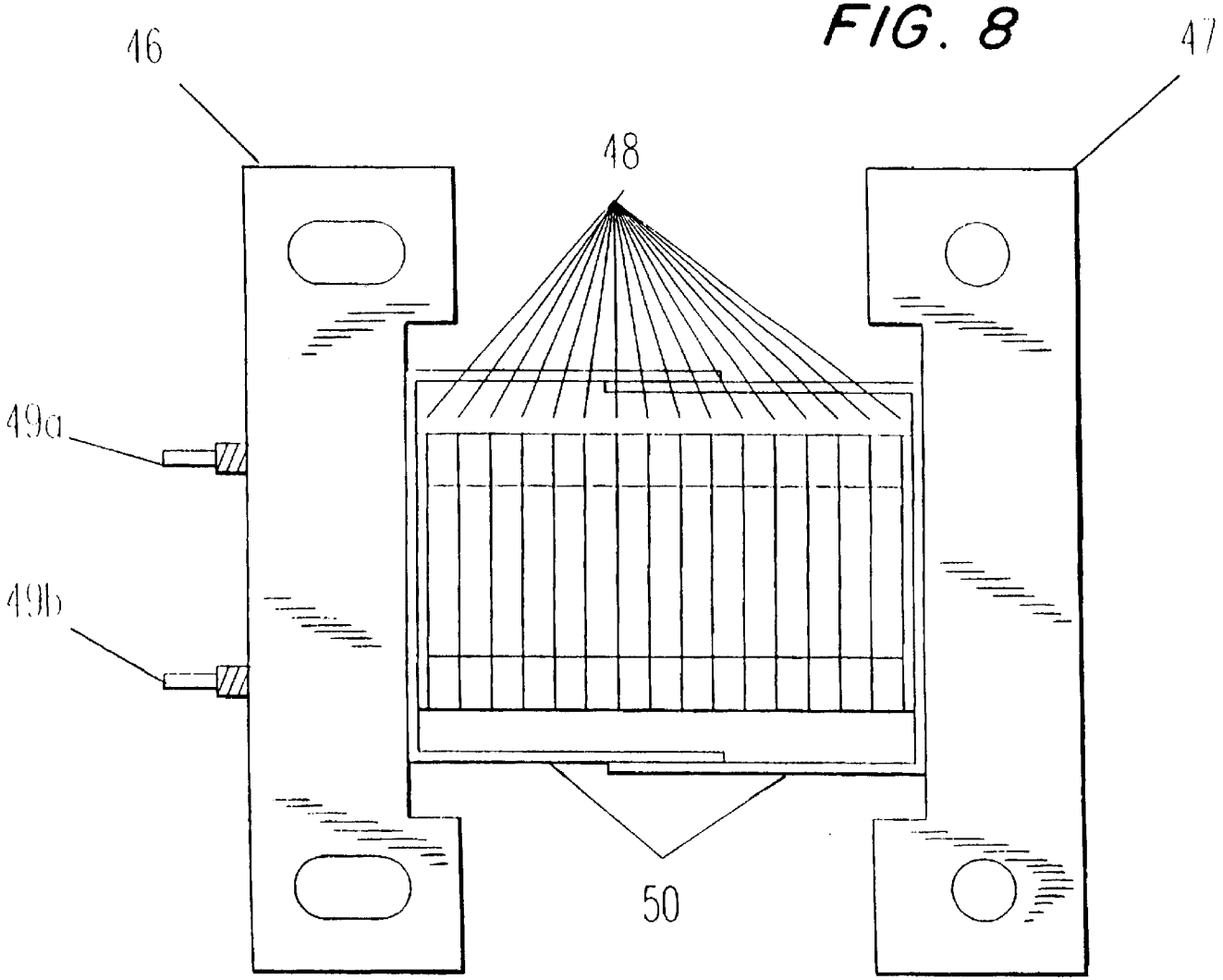
FIG. 8 is a diagram of the multideflector as used in the Bruker orthogonal TOF mass spectrometer.

In FIG. 8 a diagram of multideflector 45 as used in the Bruker orthogonal TOF mass spectrometer is depicted.. Multideflector 45 consists of two insulating holders 46 and 47, 16 bipolar deflection plates 48, metal rods 49a and 49b for support and electrical contact, and two electrically grounded shields 50. Ions pass between plates 48 in a direction normal to the plane of the drawing. To make the multideflector inactive, rods 49a and 49b are held at ground potential. This in turn holds both sides of all the deflection plates at ground. When grounded, ions pass unperturbed through the multideflector. To energize multi deflector 45, rods 49a and 49b are biased to the same magnitude potential but with opposite polarities. Because rod 49a is electrically connected with the same side of all the deflection plates (e.g. the left side) and rod 49b is electrically connected with the opposite side of every deflection plate (e.g. the right side), the deflection plates are biased as shown in FIGS. 5A and 6B. Ions passing through the energized device will be deflected as discussed above.

Figure 9:
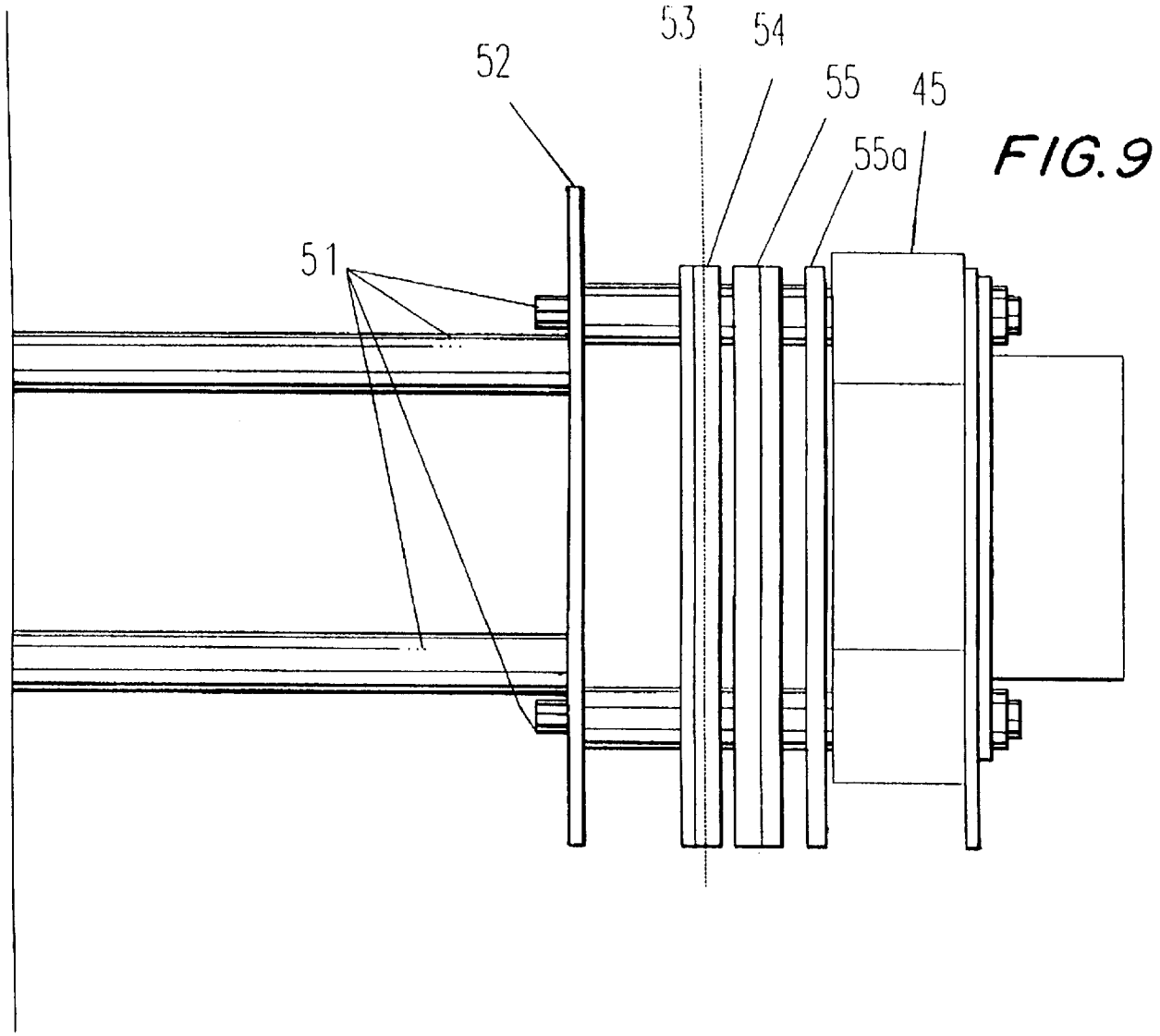
FIG. 9 is a diagram of the Bruker orthogonal TOF interface including the multideflector according to the present invention.

FIG. 9 is a depiction of Broker orthogonal TOF interface including support rods 51, baseplate 52, repeller 54, extraction grid 55, ground grid 55a, and multideflector 45. When the repeller and extraction grid are at ground, ions generated in source 2 pass between the repeller and the extraction grid along path 53. At appropriate intervals, the repeller and extraction grid are pulsed to a high electrical potential. Ions between the repeller and extraction grid at the time of the pulse are accelerated in the orthogonal direction (i.e. orthogonal to path 53) by the electric field established by the potentials on electrodes 54, 55, and 55a. Multideflector 45 deflects the ions so as to eliminate ion motion in the axial direction (i.e. in the dimension of path 53).

In this situation, the multideflector has an additional advantage over conventional deflectors because of its smaller size in the orthogonal direction. The ion beam produced by source 2 is typically composed of a variety of mass-to-charge ratio ions. Often, the kinetic energy of these ions differs and is typically a function of mass. In the case of the Bruker source, the kinetic energy of the ions is a linear function of mass. A conventional deflection system cannot be adjusted to simultaneously deflect all of these ions onto an orthogonal trajectory. However, by varying the voltage on the multideflector during the ion analysis, ions of every mass can be deflected onto an orthogonal path simultaneously.

Figure 10:
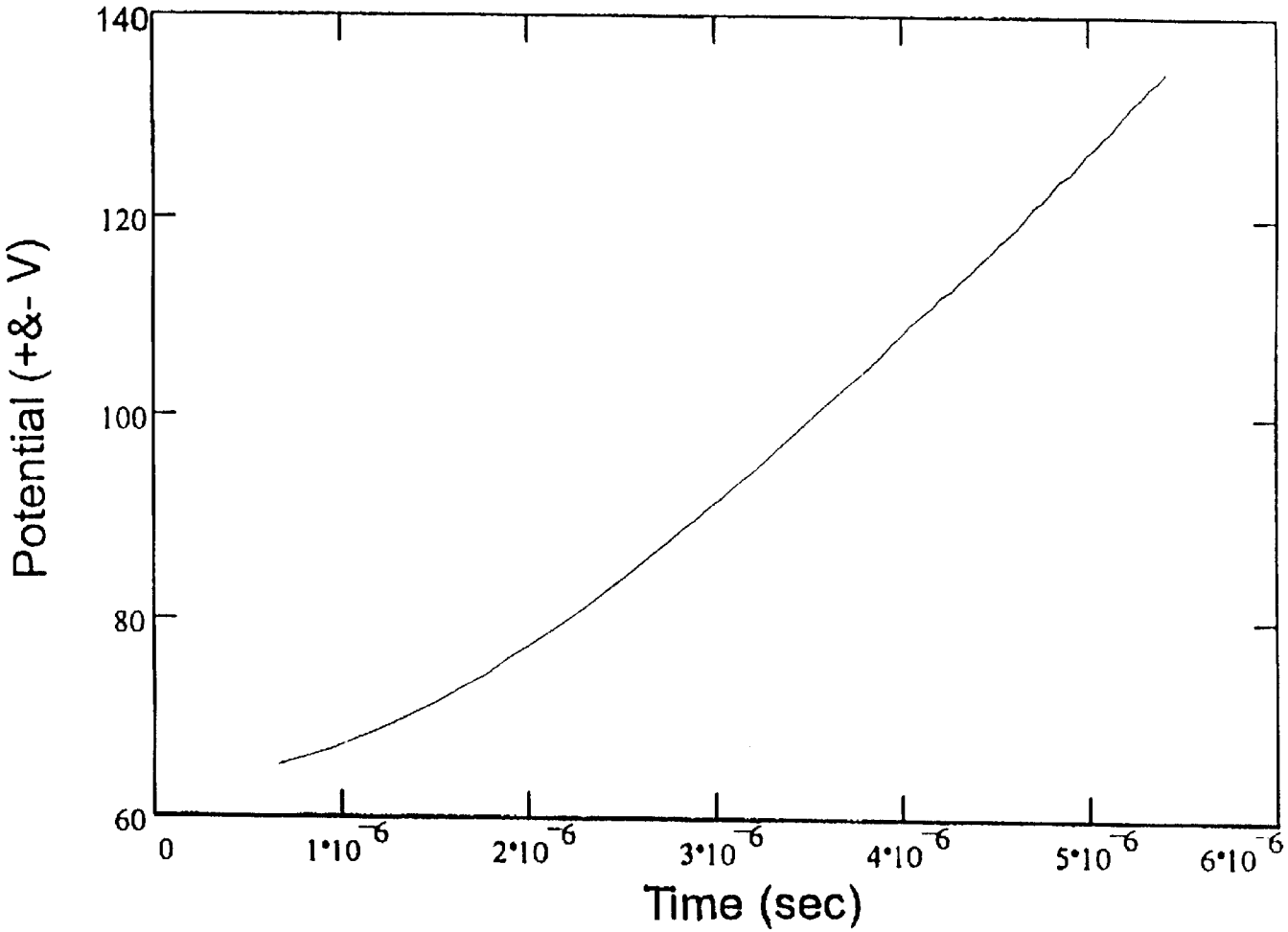
FIG. 10 is an example of the potential applied to the multideflector as used in the Bruker orthogonal TOF mass spectrometer.

As depicted in FIG. 9, there is a distance of around 25 mm between the initial position of the ions and the multideflector. Thus, some time is needed for the ions to travel this distance. This time is dependent on the mass of the ion. Because the axial kinetic energy is directly related to the mass of the ion, the required angle of deflection and therefore deflection voltage is also directly related to the mass of the ion. So, the voltage applied to the multideflector may be adjusted such that at the time of arrival of a given mass ion, the multideflector voltage is set properly to deflect that mass ion. The function of applied voltage vs. time of analysis as used with the Broker source and interface is shown in FIG. 10.

A conventional deflector cannot be used in this way because the size of the electric field in the orthogonal direction is too large. The flight time of an ion through the multideflector is about one sixth of that through the effective length of the conventional deflector discussed in FIG. 7A According to FIG. 10, the potential applied to the multideflector changes little during this time (<10%). A similar approach taken with a conventional deflector would lead to a variation in voltage of about 50% while the ion is in the deflector. This obviously would lead to improper deflection.

Figure 11:
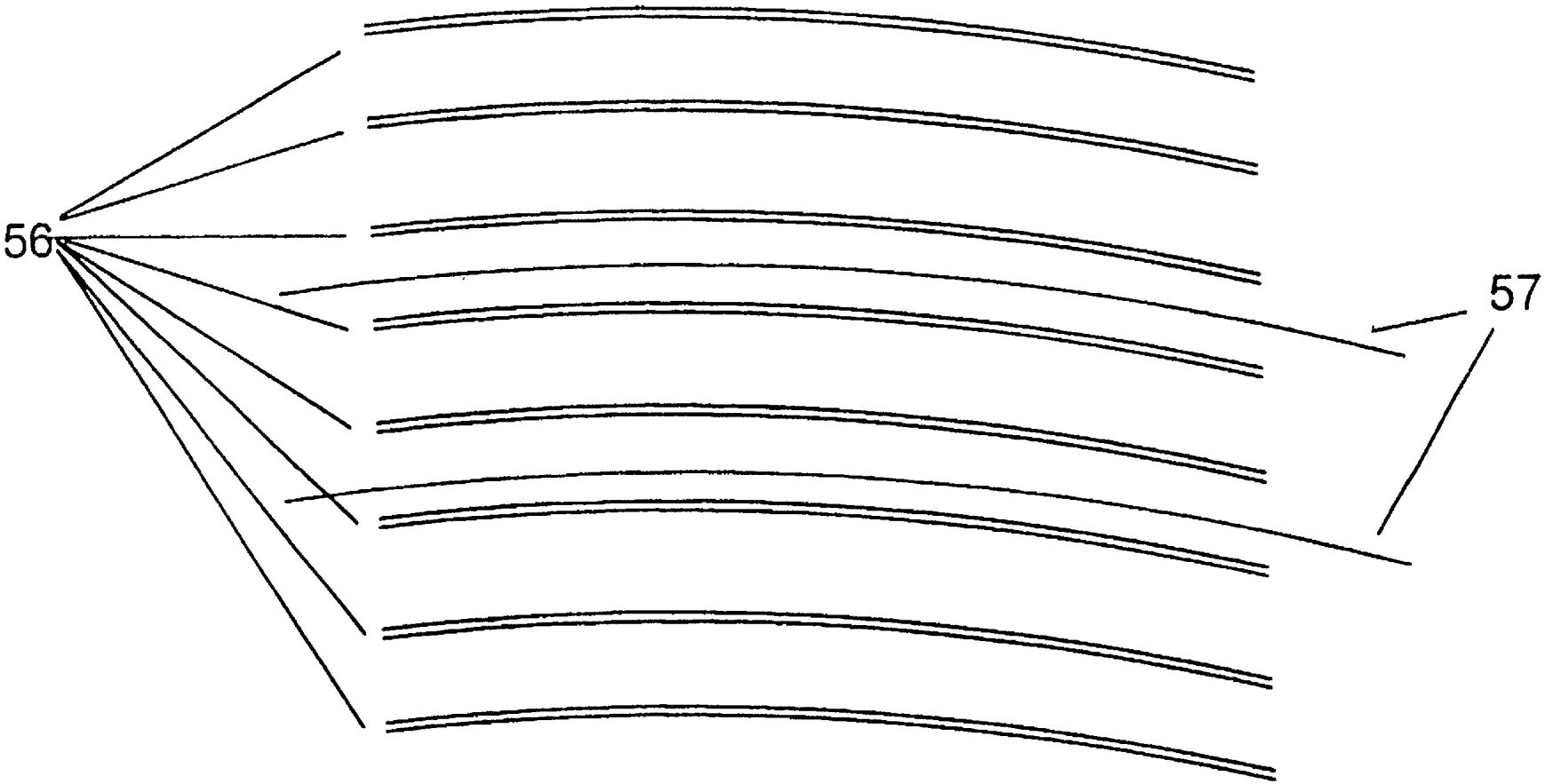
FIG. 11 is a diagram depicting a multideflector containing bipolar deflection plates which are curved to approximately the same extent as the expect ion path.

One disadvantage of using the bipolar plates as described thus far is that they are planar and thus can deflect the ion beam through only a limited angle before the ions are deflected into collisions with the deflection plates themselves. Thus, to accomplish large angles of deflection, for example 180°, curved deflection plates would be useful. FIG. 11 is a diagram of a curved plate multideflector. Here bipolar plates 56 are curved so as to be parallel to expected ion paths 57. Because plates 56 are curved, the ions never collide with the plates. This curved plate concept can in principle can be applied to any degree of deflection and any ion path.

Figure 12B:
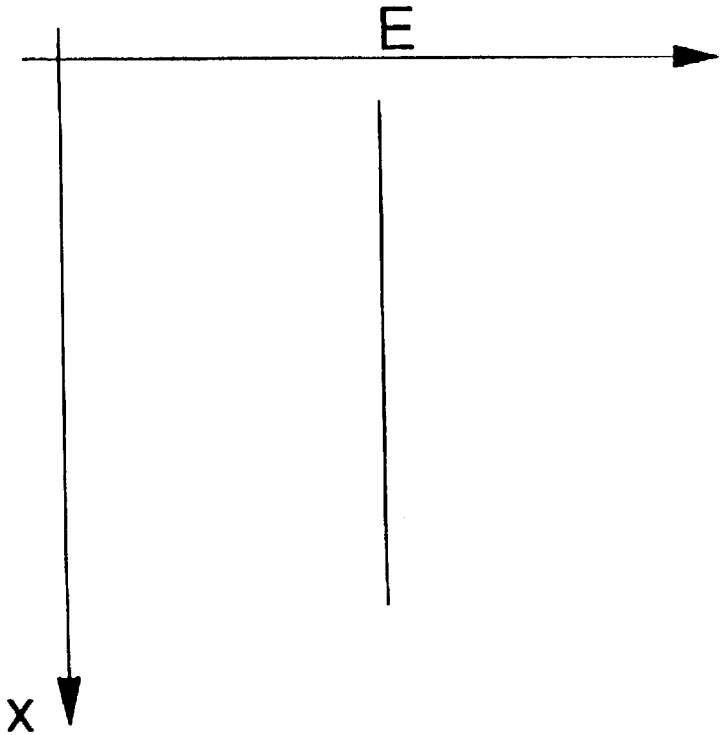
FIG. 12B is a plot depicting the electric field strength as a function of position in the multi deflector in non-focusing mode.
Figure 12A:
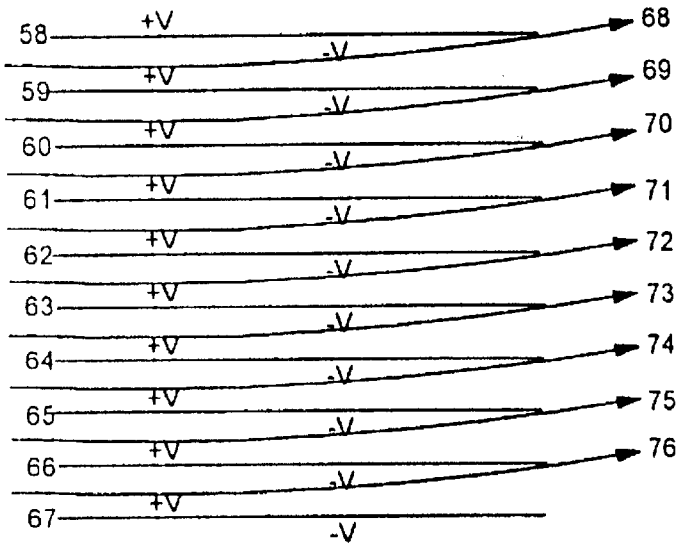
FIG. 12A is a diagram depicting example ion paths through a multideflector in non-focusing mode.

The multideflector may be used to focus or defocus ions in the deflection dimension. FIG. 12A depicts a multideflector as used in non-focusing mode. Here deflection plates 58 through 67 are all held at the same potentials. As a result, ion paths 68 through 76 are parallel to one another. That is all ions passing through the device will be deflected by the same angle. As depicted in FIG. 12B, the electric field strength within the multideflector in non-focusing mode is a constant.

Figure 13B:
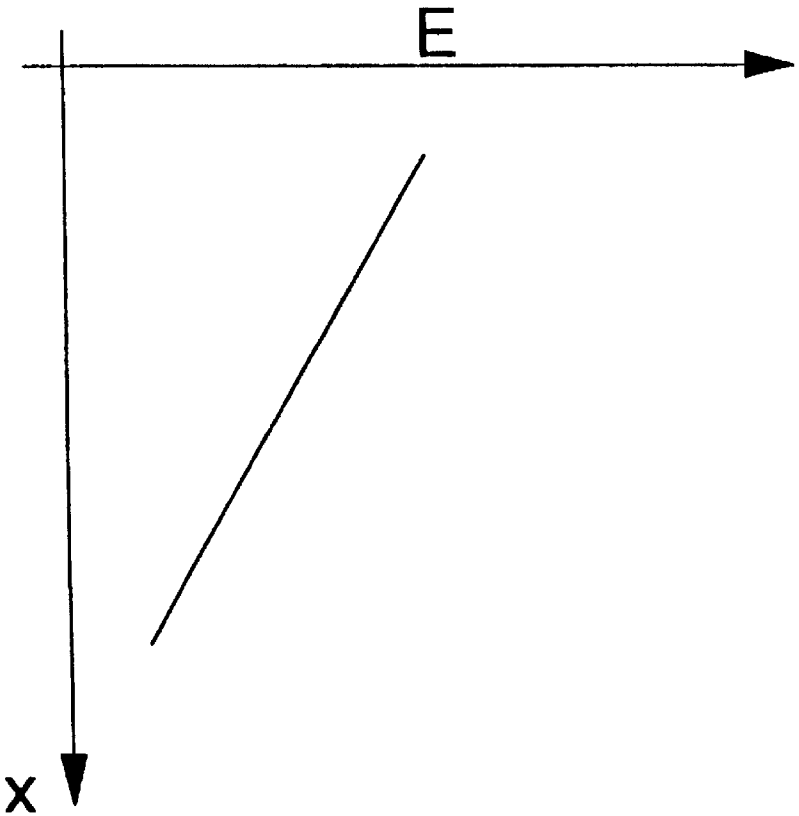
FIG. 13B is a plot depicting the electric field strength as a function of position in the multideflector in defocusing mode.
Figure 13A:
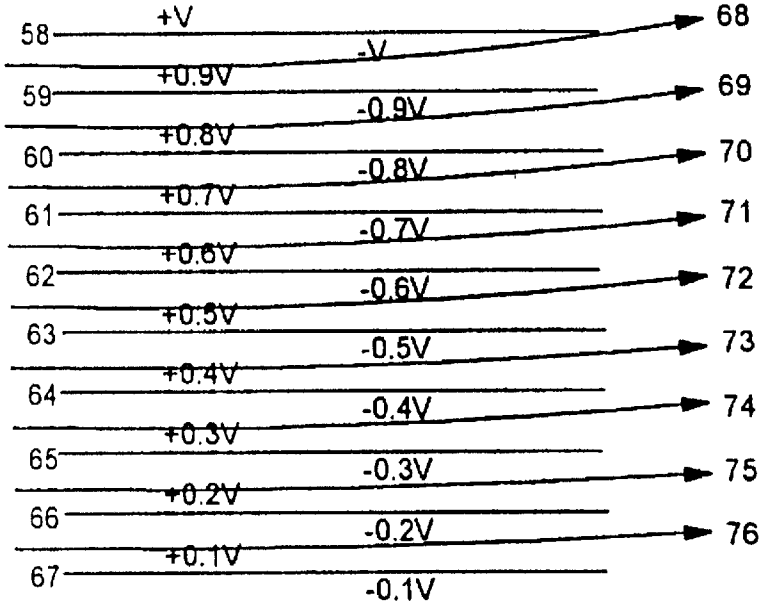
FIG. 13A is a diagram depicting example ion paths through a multideflector in defocusing mode.

FIG. 13A depicts the multideflector as it is used in defocusing mode. In this case, the potentials on plates 58 through 67 are varied so as to produce the variation in electric field strength shown in FIG. 13B. This variation in electric field strength results in ions 68 through 76 being deflected by different degrees. Ions which encounter a higher field strength are deflected by a larger angle as given by equation 5. Thus, ion path 68 shows a greater angle of deflection than ion path 76, and the ion beam is defocused.

Figure 14B:
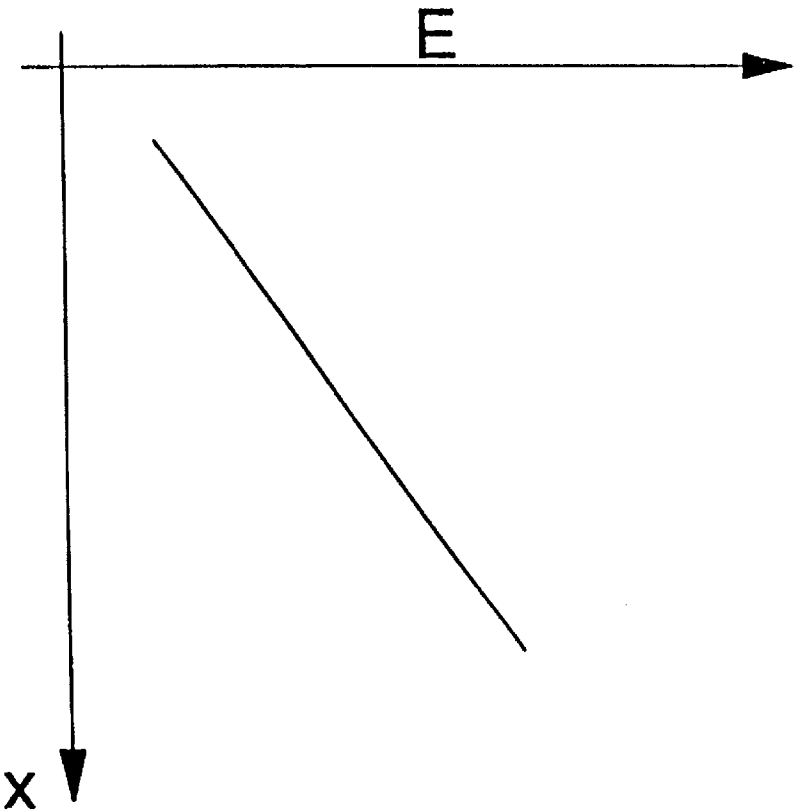
FIG. 14B is plot depicting the electric field strength as a function of position in the multideflector in focusing mode according to the present invention.
Figure 14A:
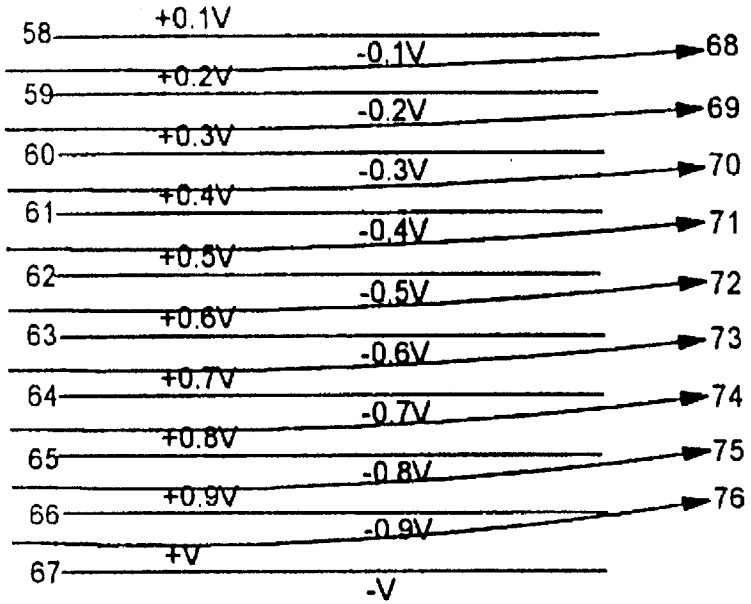
FIG. 14A is a diagram depicting example ion paths through a multideflector in focusing mode.

In a similar manner, the ion beam may be focused by increasing the electric field strength as a function of position. FIG. 14A depicts the variation of the potentials on deflection plates 58 through 67 when the multideflector is used in focusing mode. FIG. 14B depicts the corresponding variation in the electric field strength with position. So in the case of FIG. 14, ion path 68 shows a smaller angle of deflection than ion path 76 and thus the ion beam is focused. Similar focusing and defocusing effects can be obtained by varying the lengths of the deflection plates or the distances between them in accordance with equation 5.

While the foregoing embodiments of the invention have been set forth in considerable detail for the purposes of making a complete disclosure of the invention, it will be apparent to those of skill in the art that numerous changes may be made in such details without departing from the spirit and the principles of the invention.

We claim:

1. An improved time of flight mass spectrometer comprising:

a deflector for deflecting an ion from an ion path consisting of more than two plates arranged across said ion path in such a way that, during a given passage through said deflector, said ion must pass between two and only two adjacent plates; and a detector for detecting said ion;

wherein each of said plates is energized to a potential.

2. An improved time of flight mass spectrometer according to claim 1 wherein said deflector is formed by a series of conductive plates.

3. An improved time of flight mass spectrometer according to claim 2 wherein at least one of said conductive plates is metallic.

4. An improved time of flight mass spectrometer according to claim 1 wherein said deflector deflects substantially all ions away from said ion path.

5. An improved time of flight mass spectrometer according to claim 1 wherein said detector is responsive to the number of ions not deflected away from said ion path.

6. An improved time of flight mass spectrometer according to claim 1 wherein said ions are deflected away from said ion path along a plurality of directions.

7. An improved time of flight mass spectrometer according to claim 6 wherein said mass deflector is formed by a series of conductive plates.

8. An improved time of flight mass spectrometer according to claim 1 wherein said deflector is used as a mass selector.

9. An improved time of flight mass spectrometer according to claim 1 wherein at least *one* of said plates is energized to a positive potential and another of said plates is energized to a negative potential.

10. A multideflector for analyzing ions in a time of flight mass spectrometer comprising:

an ion source;

an ion detector;

a flight tube for transporting ions formed within said ion source; and a gate disposed along said flight tube;

wherein said ion source produces ions capable of travel along said flight tube, and wherein said detector detects the presence of said ions; and wherein said gate is formed by a series of metal plates arranged across said flight tube in such a way that, during a given passage through said multideflector, said ions must pass between two and only two adjacent plates, said plates being aligned to deflect substantially all ions away from the direction of ion propagation along said flight tube.

11. A multideflector according to claim 10 wherein at least one of said plates is conductive.

12. A multideflector according to claim 11 wherein at least one of said conductive plates is metallic.

13. A multideflector according to claim 10 wherein said gate deflects said ions into a plurality of directions.

14. A multideflector according to claim 10 wherein said ion source includes a laser.

15. A multideflector according to claim 10 wherein a data acquisition system is used to measure the time of flight of ions from said ion source to said detector.

16. A multideflector according to claim 15 wherein a multiplicity of detectors are used.

17. A multideflector according to claim 10 wherein a reflector is used to alter the path of ions away from said direction of propagation.

18. A multideflector according to claim 10 wherein a gate is used to select ions based on mass.

19. A mass selector for use in a time of flight instrument comprising:

a flight tube;

a gate; and an ion source;

wherein said ion source produces ions that travel through said flight tube, and wherein said gate impedes the travel of said ions by deflecting said ions into at least two directions.

20. A mass selector according to claim 19 wherein said gate is formed of a plurality of metal plates, of which at least one of said metallic plates is energized.

21. A mass selector according to claim 19 which includes a computer controller.

22. A mass selector according to claim 21 wherein said computer controller includes means to vary voltages applied to said gate.

*23. An improved time of flight mass spectrometer comprising:*

*a multideflector for deflecting ions from an ion path consisting of more than two bipolar deflection plates each comprising a pair of metal plates separated from one another by an insulator, said bipolar deflection plates being arranged across said ion path in such a way that, during a given passage through said multideflector, each of said ions must pass between two and only two adjacent bipolar deflection plates; and*

*a detector for detecting said ions;*

*wherein each of said metal plates is energized to a potential and the potentials of the metal plates of each pair have opposite polarities.*

*24. An improved time of flight mass spectrometer according to claim 23 wherein the total thickness of each bipolar plate is in order of 0.1 mm.*

*25. An improved time of flight mass spectrometer according to claim 23 wherein the insulator consists of polyamide layer.*

*26. An improved time of flight mass spectrometer according to claim 24 wherein the insulator consists of polyamide layer.*

*27. An improved time of flight mass spectrometer according to claim 23 wherein the bipolar deflection plates are curved.*

*28. An improved time of flight mass spectrometer according to claim 24 wherein the bipolar deflection plates are curved.*

*29. An improved time of flight mass spectrometer according to claim 25 wherein the bipolar deflection plates are curved.*

*30. An improved time of flight mass spectrometer according to claim 26 wherein the bipolar deflection plates are curved.*

*31. An improved time of flight mass spectrometer according to claim 23 wherein the bipolar deflection plates are placed adjacent and parallel to one another such that each metal plate of every bipolar deflection plate is facing the metal plate of the adjacent bipolar deflection plate which has the opposite polarity.*

*32. An improved time of flight mass spectrometer according to claim 31 wherein the distance between adjacent bipolar deflection plates is a constant.*

*33. An improved time of flight mass spectrometer according to claim 32 wherein the bipolar deflection plates are curved.*

*34. An improved time of flight mass spectrometer according to claim 31 wherein the distance between adjacent bipolar deflection plates varies as a function of position within the multideflector.*

*35. An improved time of flight mass spectrometer according to claim 34 wherein the bipolar deflection plates are curved.*

*36. An improved time of flight mass spectrometer according to claim 23 wherein the potentials on the conducting electrodes is held constant.*

*37. An improved time of flight mass spectrometer according to claim 23 wherein the potentials on the conducting electrodes is varied as a function of time.*

*38. An improved time of flight mass spectrometer according to claim 32 wherein the potentials on the conducting electrodes is held constant.*

*39. An improved time of flight mass spectrometer according to claim 32 wherein the potentials on the conducting electrodes is varied as a function of time.*

*40. An improved time of flight spectrometer according to claim 1 wherein said deflector deflects substantially all ions from one ion path to a second ion path.*

* * * * *

UNITED STATES PATENT AND TRADEMARK OFFICE

CERTIFICATE OF CORRECTION

PATENT NO. : RE 38,861 E
APPLICATION NO. : 09/432984
DATED : November 1, 2005
INVENTOR(S) : Melvin A. Park It is certified that error appears in the above-identified patent and that said Letters Patent is hereby corrected as shown below:

On the title page, item
Cross-Reference to related patents:
This patent is the parent of application 10/351,965 and a reissue of U.S. Patent No. 5,696,375.

Signed and Sealed this

Eighth Day of July, 2008

JON W. DUDAS
*Director of the United States Patent and Trademark Office*